United States Patent
Memory

(10) Patent No.: US 7,798,078 B2
(45) Date of Patent: Sep. 21, 2010

(54) GRANULAR CONTAINMENT ASSEMBLY AND METHOD

(75) Inventor: Russell James Memory, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/271,822

(22) Filed: Nov. 14, 2008

(65) Prior Publication Data

US 2010/0124958 A1 May 20, 2010

(51) Int. Cl.
*A01C 7/00* (2006.01)
*A01C 9/00* (2006.01)

(52) U.S. Cl. .................... 111/173; 111/925
(58) Field of Classification Search ............. 111/14, 111/170, 173, 925
See application file for complete search history.

(56) References Cited

U.S. PATENT DOCUMENTS

| 524,474 | A | 8/1894 | Wade |
|---|---|---|---|
| 670,534 | A | 3/1901 | Carmical |
| 1,369,649 | A | 2/1921 | Gieseler |
| 2,062,295 | A | 12/1936 | Cary et al. |
| 2,171,205 | A | 8/1939 | Zinke |
| 2,193,738 | A | 3/1940 | Perrin |
| 2,559,183 | A | 7/1951 | Banett |
| 2,671,690 | A | 3/1954 | Von Ehrenkrook |
| 2,814,531 | A | 11/1957 | Murray, Jr. |
| 2,937,049 | A | 5/1960 | Osawa |
| 3,197,261 | A | 7/1965 | Kauffman |
| 3,207,560 | A | 9/1965 | Brown |
| 3,376,897 | A | 4/1968 | Dolder et al. |
| 3,386,474 | A | 6/1968 | Kimmel |
| 3,387,895 | A | 6/1968 | Hochmuth el al. |
| 3,515,315 | A | 6/1970 | Kidd |
| 3,543,704 | A | 12/1970 | Hansen |
| 3,548,765 | A | 12/1970 | Grataloup |
| 4,036,408 | A | 7/1977 | Dugge |
| 4,082,364 | A | 4/1978 | Krambrock |
| 4,200,412 | A | 4/1980 | Steele |

(Continued)

FOREIGN PATENT DOCUMENTS

BR 9501580-9 A 11/1995

(Continued)

OTHER PUBLICATIONS

Derwent Acc-No. 2003-763187.*

*Primary Examiner*—Christopher J. Novosad
(74) *Attorney, Agent, or Firm*—Rebecca Henkel

(57) ABSTRACT

A containment assembly and method includes generally side-by-side longitudinal tanks that are oriented substantially along a direction of travel of the containment assembly. The containment assembly includes a frame, a ground engagement member, and a plurality of tanks coupled to the frame. Each tank includes a longitudinal axis defined between a fore end and an aft end that is substantially parallel to the direction of travel. A length between the fore end and the aft end of the tank is greater than the width between a left side and a right side of the tank. A tank bottom surface is contoured to direct the granular material toward the aft end. The plurality of tanks are oriented such that at least a right side or a left side of one tank is proximate at least a right side or a left side of another one of the plurality of tanks.

10 Claims, 4 Drawing Sheets

U.S. PATENT DOCUMENTS

| | | | |
|---|---|---|---|
| 4,244,522 A | 1/1981 | Hartwig | |
| 4,264,243 A | 4/1981 | Bentzen/Bilkvist | |
| 4,280,419 A | 7/1981 | Fischer | |
| 4,379,664 A | 4/1983 | Klein et al. | |
| 4,407,207 A * | 10/1983 | Dreyer | 111/136 |
| 4,413,935 A | 11/1983 | Smith et al. | |
| 4,478,159 A * | 10/1984 | Melgoza | 111/52 |
| 4,506,704 A | 3/1985 | Boom et al. | |
| 4,553,882 A | 11/1985 | Knappertz | |
| 4,562,779 A | 1/1986 | Briggs | |
| 4,653,410 A * | 3/1987 | Typpi | 111/172 |
| 4,674,922 A | 6/1987 | Federhen et al. | |
| 4,738,770 A | 4/1988 | Hastings et al. | |
| 4,779,765 A | 10/1988 | Neumeyer | |
| 4,793,743 A | 12/1988 | Grodecki et al. | |
| 4,843,983 A | 7/1989 | Olson | |
| 4,872,785 A | 10/1989 | Schrage et al. | |
| 5,033,914 A | 7/1991 | Wuertele et al. | |
| 5,069,583 A | 12/1991 | Caldwell | |
| 5,156,102 A | 10/1992 | Andersen | |
| 5,161,473 A | 11/1992 | Landphair et al. | |
| 5,240,355 A | 8/1993 | Hudalla | |
| 5,379,706 A | 1/1995 | Gage et al. | |
| 5,392,722 A | 2/1995 | Snipes et al. | |
| 5,407,305 A | 4/1995 | Wallace | |
| 5,494,381 A | 2/1996 | Heyl et al. | |
| 5,501,404 A * | 3/1996 | Meyer et al. | 239/676 |
| 5,575,225 A | 11/1996 | Smith et al. | |
| 5,749,682 A | 5/1998 | Epting | |
| 5,813,801 A | 9/1998 | Newbolt et al. | |
| 5,878,679 A | 3/1999 | Gregor et al. | |
| 5,927,217 A | 7/1999 | Halford et al. | |
| 6,047,652 A | 4/2000 | Prairie et al. | |
| 6,253,693 B1 | 7/2001 | Mayerle et al. | |
| 6,298,797 B1 | 10/2001 | Mayerle et al. | |
| 6,308,645 B1 | 10/2001 | Newkirk et al. | |
| 6,308,646 B1 | 10/2001 | Luxon | |
| 6,311,727 B1 | 11/2001 | Campau | |
| 6,343,896 B1 | 2/2002 | Goodier et al. | |
| 6,499,413 B2 | 12/2002 | Kleinknecht et al. | |
| 6,505,569 B1 | 1/2003 | Richard | |
| 6,581,532 B1 | 6/2003 | Hagen et al. | |
| 6,584,919 B2 | 7/2003 | McQuinn | |
| 6,644,225 B2 | 11/2003 | Keaton | |
| 6,648,558 B1 | 11/2003 | Shultz | |
| 6,742,464 B1 | 6/2004 | Chiu | |
| 6,782,835 B2 | 8/2004 | Lee et al. | |
| 6,851,377 B2 * | 2/2005 | Mayerle et al. | 111/174 |
| 6,854,405 B2 | 2/2005 | Memory | |
| 6,899,042 B1 | 5/2005 | Kowalchuk | |
| 6,904,851 B2 | 6/2005 | Memory | |
| 6,928,938 B2 | 8/2005 | Memory | |
| 6,928,939 B1 | 8/2005 | Johnson et al. | |
| 6,935,254 B2 | 8/2005 | Ostrander et al. | |
| 7,017,502 B2 | 3/2006 | Quam et al. | |
| 7,040,242 B2 | 5/2006 | Memory | |
| 7,048,475 B2 | 5/2006 | Cloue et al. | |
| 7,101,120 B2 | 9/2006 | Jurkovich | |
| 7,213,525 B2 | 5/2007 | Meyer et al. | |
| 7,267,061 B2 | 9/2007 | Mayerle | |
| 7,270,064 B2 | 9/2007 | Kjelsson et al. | |
| 7,578,247 B2 * | 8/2009 | Horn | 111/200 |
| 2006/0243179 A1 | 11/2006 | Landphair et al. | |
| 2007/0022928 A1 | 2/2007 | Kowalchuk | |
| 2007/0181048 A1 | 8/2007 | Pleyer | |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 A | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

* cited by examiner

GRANULAR CONTAINMENT ASSEMBLY AND METHOD

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates generally to the containment of granular material used in connection with an agricultural implement such as an air seeder or planter. In particular, the present invention relates to a containment assembly and method having generally side-by-side longitudinal tanks oriented substantially along a direction of travel of the containment assembly.

BACKGROUND OF THE INVENTION

Many agricultural processes require the delivery of a granular material, such as seed, fertilizer, herbicides, and the like, from a tank to an outlet or secondary containment system. For example, a planter typically includes one or more tanks that are integrated with the planter implement. The granular material is extracted from the respective tank and dispersed through the planter in the desired configuration. As another example, seeders are generally coupled to a cart that includes one or more tanks secured to the cart. Similar to the planter arrangement, the granular material is supplied from the tanks to the seeder for ultimate distribution to the ground.

Current granular containment assemblies include tank orientations in which the tank, or tanks, are generally oriented transverse to the direction of travel as the tank is pulled behind a tractor or other agricultural vehicle. If the width of the tanks becomes excessive, transporting the containment assembly presents a variety of practical problems, including width restrictions on rural roads. As a result, and in combination with the factors discussed below, the ultimate capacity of these transverse tanks is limited.

In addition, current tanks are generally configured to provide a single granular material drain. In order to accomplish this, steeply angled bottoms are employed to extract all of the granular material from the tank when desired. This arrangement creates long drain distances, the steeply angled bottom shifts the bulk of the granular material upward, thereby raising the center of gravity of the overall granular containment assembly.

Further weight considerations impact the positioning and orientation of the tanks. Specifically, the tanks must be located relative to ground engagement wheels to ensure that the desired amount of tongue weight is carried by the agricultural vehicle, especially as the granular material is expelled from the tanks during operation. Transversely oriented tanks have a tendency to limit the positioning and overall size of the ground engagement wheels as the width of the tanks is expanded to accommodate a greater amount of granular material.

Certain tanks incorporate an internal auger to aid in the removal or transfer of the granular materials. In current tanks, the tank configuration and overall orientation results in a generally centrally located auger opening. As a result, the auger is difficult to access and clean, especially when issues arise during use that require corrective action in the field.

In view of at least the preceding considerations related to current granular containment assemblies, including the drawbacks related to high centers of gravity, long granular material drain distances, limited ground engagement wheel positioning, and difficult auger access and cleaning, a need exists for a granular containment assembly establishing a lower center of gravity, efficient drains, varied ground engagement wheel positioning, and easy auger access.

SUMMARY OF THE INVENTION

The present invention overcomes the aforementioned drawbacks by providing a containment assembly and method having generally side-by-side longitudinal tanks oriented substantially along a direction of travel of the containment assembly.

In accordance with one aspect of the invention, a containment assembly movable along a direction of travel for containing a granular material, comprises a frame and a pair of ground engagement wheels rotatably coupled to the frame. A first tank is coupled to the frame and comprises a first tank fore end and a first tank aft end that is spaced apart from the first tank fore end. A first tank longitudinal axis is defined between the first tank fore end and the first tank aft end. The first tank longitudinal axis is substantially parallel to the direction of travel. A first tank length is defined between the first tank fore end and the first tank aft end. A first tank left side extends between the first tank fore end and the first tank aft end. A first tank right side is spaced apart from the first tank left side and extends between the first tank fore end and the first tank aft end. A first tank width is defined between the first tank left side and the first tank right side. A first tank bottom surface extends between the first tank fore end, the first tank aft end, the first tank left side, and the first tank right side. The first tank bottom surface is contoured to direct the granular material toward the first tank aft end. The first tank length is greater than the first tank width. A second tank is coupled to the frame and comprises a second tank fore end and a second tank aft end that is spaced apart from the second tank fore end. A second tank longitudinal axis is defined between the second tank fore end and the second tank aft end. The second tank longitudinal axis is substantially parallel to the direction of travel. A second tank length is defined between the second tank fore end and the second tank aft end. A second tank left side extends between the second tank fore end and the second tank aft end. A second tank right side is spaced apart from the second tank left side and extends between the second tank fore end and the second tank aft end. A second tank width is defined between the second tank left side and the second tank right side. A second tank bottom surface extends between the second tank fore end, the second tank aft end, the second tank left side, and the second tank right side. The second tank bottom surface is contoured to direct the granular material toward the second tank aft end. The second tank length is greater than the second tank width. One of the first tank left side and the first tank right side are proximate one of the second tank left side and the second tank right side.

The first tank may further comprise an auger proximate the first tank bottom surface for augering the granular material toward the first tank aft end.

The first tank may further comprise a first tank cover extending between the first tank fore end, the first tank aft end, the first tank left side, and the first tank right side. And, the containment assembly may further comprise a pressure supply secured to the frame and operatively coupled to the first tank, wherein the first tank is substantially capable of being pressurized by the pressure supply. The first tank may further comprise a first tank outlet proximate the first tank aft end and the first tank bottom surface.

The containment assembly may further comprise an induction auger extending into the first tank to auger the granular material from the first tank. The first tank right side and the second tank left side may comprise a single wall.

The first tank right side may be adjacent the second tank left side.

The first tank length may be substantially equal to the second tank length. The first tank width may be substantially equal to the second tank width.

In accordance with another aspect of the invention, a containment assembly movable along a direction of travel for containing a granular material comprises a frame and a ground engagement member coupled to the frame. A plurality of tanks are coupled to the frame. Each of the plurality of tanks comprises a fore end, an aft end that is spaced apart from the fore end, and a longitudinal axis defined between the fore end and the aft end, the longitudinal axis substantially parallel to the direction of travel. A length is defined between the fore end and the aft end along the longitudinal axis. Each of the plurality of tanks comprises a left side extending between the fore end and the aft end, a right side that is spaced apart from the left side extending between the fore end and the aft end, a width defined between the left side and the right side, and a bottom surface extending between the fore end, the aft end, the left side, and the right side. The bottom surface is contoured to direct the granular material toward the aft end. The length is greater than the width. The plurality of tanks are oriented such that at least one of a right side and a left side of one of the plurality of tanks is proximate at least one of a right side and a left side of another one of the plurality of tanks.

At least one of the plurality of tanks may further comprise an auger proximate a respective tank bottom surface for augering the granular material toward a respective tank aft end.

At least one of the plurality of tanks may further comprise a pressure tank having a tank cover extending between a respective tank fore end, a respective tank aft end, a respective tank left side, and a respective tank right side. The containment assembly may further comprise a pressure supply secured to the frame and operatively coupled to the pressure tank, wherein the pressure tank is substantially capable of being pressurized by the pressure supply. The pressure tank may further comprise a tank outlet proximate a respective tank aft end and a respective tank bottom surface.

The containment assembly may further comprise an induction auger extending into at least one of the plurality of tanks to auger the granular material from the at least one of the plurality of tanks.

The plurality of tanks may comprise a left tank and a right tank, wherein a respective right side of the left tank is adjacent a respective left side of the right tank. The respective right side of the left tank and the respective left side of the right tank may comprise a single wall.

In accordance with still another aspect of the invention, a method of manufacturing a containment assembly movable along a direction of travel for containing a granular material comprises the steps of: providing a frame having a pair of ground engagement wheels coupled to the frame; providing a first tank, comprising: a first tank fore end, a first tank aft end that is spaced apart from the first tank fore end, a first tank longitudinal axis defined between the first tank fore end and the first tank aft end, a first tank length defined between the first tank fore end and the first tank aft end, a first tank left side extending between the first tank fore end and the first tank aft end, a first tank right side that is spaced apart from the first tank left side extending between the first tank fore end and the first tank aft end, a first tank width defined between the first tank left side and the first tank right side, and a first tank bottom surface extending between the first tank fore end, the first tank aft end, the first tank left side, and the first tank right side, wherein the first tank bottom surface is contoured to direct the granular material toward the first tank aft end and wherein the first tank length is greater than the first tank width; providing a second tank, comprising: a second tank fore end, a second tank aft end that is spaced apart from the second tank fore end, a second tank longitudinal axis defined between the second tank fore end and the second tank aft end, a second tank length defined between the second tank fore end and the second tank aft end, a second tank left side extending between the second tank fore end and the second tank aft end, a second tank right side that is spaced apart from the second tank left side extending between the second tank fore end and the second tank aft end, a second tank width defined between the second tank left side and the second tank right side, and a second tank bottom surface extending between the second tank fore end, the second tank aft end, the second tank left side, and the second tank right side, wherein the second tank bottom surface is contoured to direct the granular material toward the second tank aft end and wherein the second tank length is greater than the second tank width; aligning the first tank longitudinal axis substantially parallel to the direction of travel; aligning the second tank longitudinal axis substantially parallel to the direction of travel; orienting the first tank and the second tank such that one of the first tank left side and the first tank right side are proximate one of the second tank left side and the second tank right side; coupling the first tank to the frame; and coupling the second tank to the frame.

The foregoing and other aspects of the invention will appear in the detailed description that follows. In the description, reference is made to the accompanying drawings, which illustrate preferred example embodiments of the invention.

DETAILED DESCRIPTION OF THE EXAMPLE EMBODIMENTS

The following applications, each having a filing date of Nov. 14, 2008, are hereby incorporated by reference as if fully set forth herein: U.S. application Ser. No. 12/271,618 ("Sectional Distribution of Granular Product"); U.S. application Ser. No. 12/271,679 ("Agricultural Implement with Dense Phase Product Flow from a Primary Container"); U.S. application Ser. No. 12/271,723 ("Device and Method for Dense Phase Transport of Seed"); U.S. application Ser. No. 12/271,745 ("Agricultural Implement with Dense Phase Product Dispensing and Purging"); U.S. application Ser. No. 12/271,765 ("Valve and Method for Dense Phase Flow Control"); U.S. application Ser. No. 12/271,787 ("Dense Phase Distribution Branch"); U.S. application Ser. No. 12/271,808 ("Pressure Supply Assembly for an Agricultural Implement with Dense Phase Product Flow"); and U.S. application Ser. No. 12/271, 816 ("Dense Phase Induction System and Method").

Figure 1:
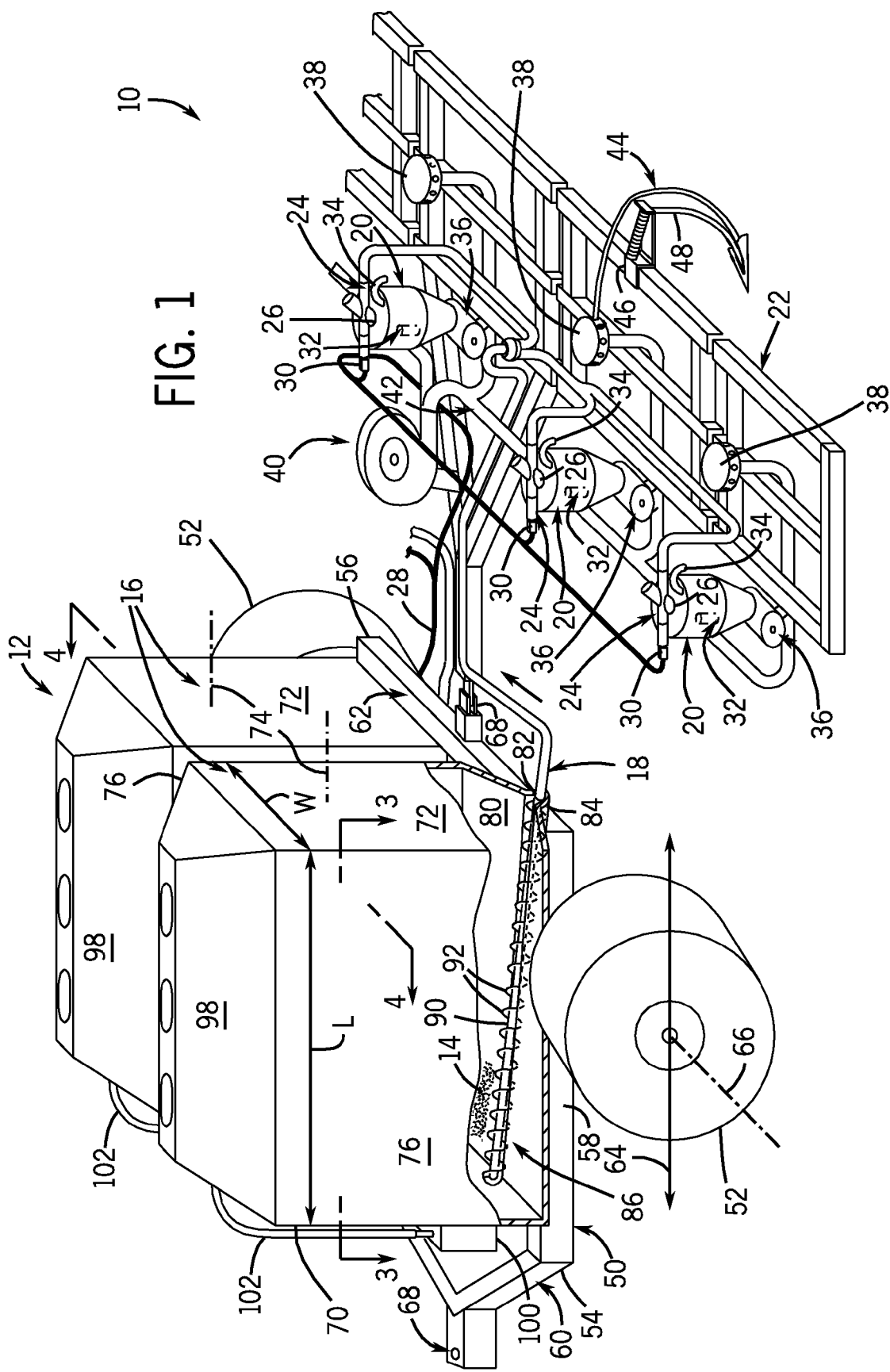
FIG. 1 is a partial isometric view of a dense phase air seeder incorporating an exemplary containment assembly.

A partial perspective view of an agricultural implement 10 incorporating an exemplary containment assembly 12 is shown generally in FIG. 1. The containment assembly 12 is described in the context of the agricultural industry and the distribution of granular material, such as seed, fertilizer, herbicide, and the like; however, the description is not intended to be limiting. As a result, the claimed containment assembly 12 may be implemented in a variety of industries and contexts to distribute a range of granular materials.

With continued reference to FIG. 1, the agricultural implement 10 (shown as a dense phase air seeder) is configured to be towed by an agricultural vehicle, such as a tractor (not shown), in a tow-between configuration. A variety of agricultural implements 10 may be configured for use with the containment assembly 12. For example, a typical seeder (i.e., non-dense phase), a planter, and the like are capable of being configured for use with the containment assembly 12 by one skilled in the art given the benefit of this disclosure. Moreover, the containment assembly 12 may be integral with the agricultural implement 10 and thus need not be a separate unit.

In the exemplary embodiment, the agricultural implement 10 (i.e., the dense phase air seeder) receives a dense phase flow of granular material 14 (e.g., seed) from the tanks 16. During dense phase flow, a high volume of granular material 14 is pneumatically motivated through a plurality of delivery lines 18. The granular material 14 travels downstream through the delivery lines 18 to a series of secondary containments 20 secured to the seeding frame 22 (only a portion of the seeding frame 22 is shown in FIG. 1 for clarity). Each delivery line 18 includes a valve 24 proximate an inlet 26 of the respective secondary containments 20. The valve 24 is selectively actuated by a combination of pneumatic pressure supplied via pressure line 28 and individual solenoids 30 to fill each secondary containment 20 to the desired level as determined by a controller (not shown) in conjunction with a level sensor 32 secured to each secondary containment 20. The valve 24 is further described in U.S. patent application Ser. No. 12/271,765 that is hereby incorporated by reference as if fully set forth herein. A vent 34 extends from each secondary containment 20 to prevent excessive back pressure from developing in the secondary containments 20.

From each secondary containment 20, a metering device 36 regulates the delivery of granular material 14 to a respective dilute phase delivery head 38. A dilute phase air supply 40 (e.g., a blower) charges a dilute phase delivery line 42 with sufficient pneumatic pressure to motivate the granular material 14 through the dilute phase delivery heads 38 and along the plurality of distribution lines 44 (only one is shown for simplicity). Each delivery line 44 is secured to the seeding frame 22 by a bracket 46 supporting a spring-loaded arcuate rod 48, as is known to one of ordinary skill in the art. It is of note that the preceding general description of an examplary agricultural implement 10 is one of numerous agricultural implements 10 capable of being adapted for use with the containment assembly 12, an example embodiment of which is described below.

With continued reference to FIG. 1, the containment assembly 12 and related components are described in greater detail. The example embodiment will be described with reference to a pair of tanks 16; however a plurality of tanks 16 may be configured within the scope of the present invention. Each of the tanks 16 is secured to a frame 50 having a pair of ground engagement wheels 52 rotatably coupled to the frame 50. One skilled in the art will appreciate the variety of ground engagement members (e.g., tracks, wheels, etc.) and configurations (e.g., tandem axles) that may be coupled to the frame 50 in addition to or in lieu of the ground engagement wheels 52 of the example embodiment. The frame 50 generally includes a fore end 54 and an aft end 56 and has a pair of side rails 58 coupled by a fore A-frame 60 and an aft cross-member 62. Many alternative frame 50 constructions are available and will be appreciated by one skilled in the art.

The ground engagement wheels 52 are preferably positioned relative to the tanks 16 and generally define a direction of travel 64 substantially normal to an axle 66 of the ground engagement wheels 52. Of course, the direction of travel 64 may be continually changing as the agricultural vehicle (not shown) pulls the containment assembly 12 and agricultural implement 10 during operation. Moreover, the ground engagement wheels 52 are preferably positioned to establish the desired tongue weights at each of the possible couplings 68 located proximate the fore A-frame 60 and aft cross-member 62, respectively. The location or placement of the axle 66, and thus the ground engagement wheels 52, is generally positioned somewhere between a longitudinal midpoint of the tank 16 and a location spaced approximately one-third of a tank length L (discussed below) from the aft end 72. One skilled in the art will appreciate the range of adjustment of the ground engagement wheels 52 and type/size thereof made practical by the configuration and orientation of the tanks 16.

With continued reference to FIG. 1 and additional reference to FIGS. 2-4, the construction and orientation of the tanks 16 will be described. The tank 16 construction will be described with reference to a single tank 16, with the understanding that any additional tank(s) is/are similar in construction. The tank 16 is preferably fabricated of steel or durable plastic that is structurally capable of being pressurized to pressures of at least one bar (i.e., approximately fourteen and one-half pounds per square inch gauge). The tank 16 is preferably defined by a fore end 70 and an aft end 72 that is spaced apart from the fore end 70. A tank longitudinal axis 74 is substantially parallel to the direction of travel 64 and is defined generally between the fore end 70 and the aft end 72. The tank length L is also generally defined between the fore end 70 and the aft end 72. In the example embodiment, the tank length L is approximately between twelve feet to fifteen feet—many other tank lengths L are contemplated.

The tank 16 also has a left side 76 that extends between the fore end 70 and the aft end 72, and a right side 78 that is spaced apart from the left side 76 that also extends between the fore end 70 and the aft end 72. A tank width W is generally defined between the left side 76 and the right side 78; in the example embodiment, the tank width W is between approximately forty-two inches and forty-five inches—many other tank widths W are contemplated.

A bottom surface 80 extends between the fore end 70, the aft end 72, the left side 76, and the right side 78 and is contoured to direct the granular material 14 toward the aft end 72 of the tank 16. The bottom surface 80 is preferably sloped from the fore end 70 toward the aft end 72 to aid the transfer of the granular material 14 from the tank 16 through an outlet 82 proximate the junction of the aft end 72 and the bottom surface 80. In many current tank configurations, a bottom surface is steeply sloped at an angle greater than that of the angle of repose (i.e., the angle, relative to a horizontal plane, that a pile of granular material forms in a natural state) to ensure that the granular material 14 drains through a generally central opening. The bottom surface 80 of the example embodiment is gradually sloped and defines a longitudinal pocket 84 (best shown in FIG. 4) that receives an auger 86. The pocket 84 is preferably substantially parallel to the left side 76 and right side 78. In the example embodiment, a pair of bottom panels 77 slope toward the pocket 84 at approximately thirty degrees proximate the fore end 70 and gradually increase to approximately forty-seven degrees proximate the aft end 72. One skilled in the art will appreciate the variations related to the pocket 84 and bottom panels 77 that are within the scope of the disclosure.

The auger 86 is rotatably secured to the tank 16 at the fore end 70 via a bearing 88 and at the aft end via a release mechanism 89 that releasably couples the auger 86 to the bottom surface 80 of the tank 16, as described in U.S. Pat. No. 6,854,405 that is hereby incorporated by reference as if fully set forth herein. The auger 86 includes a shaft 90 with a plurality of blades 92 spiraled about the shaft 90. A drive end 94 extends through the fore end 70 of the tank 16 and is driven by a motor (not shown) to selectively auger the granular material 14 toward the outlet 82. The auger 86 reduces the required slope of the bottom surface 80 therefore keeping the center of gravity of granular material 14 within the tank relatively low within the tank 16.

Figure 3:
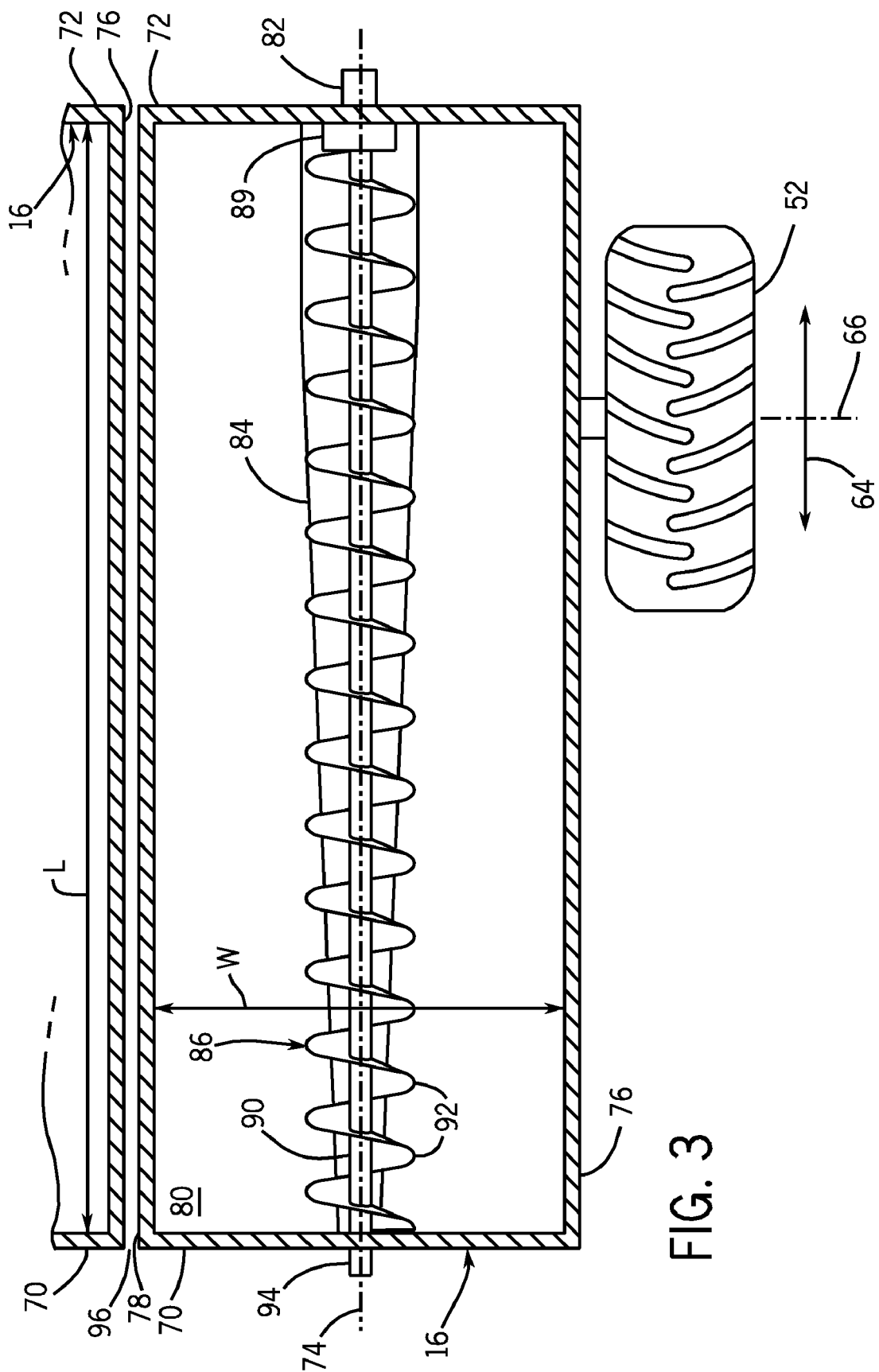
FIG. 3 is a partial top view along line 3-3 of FIG. 1.
Figure 4:
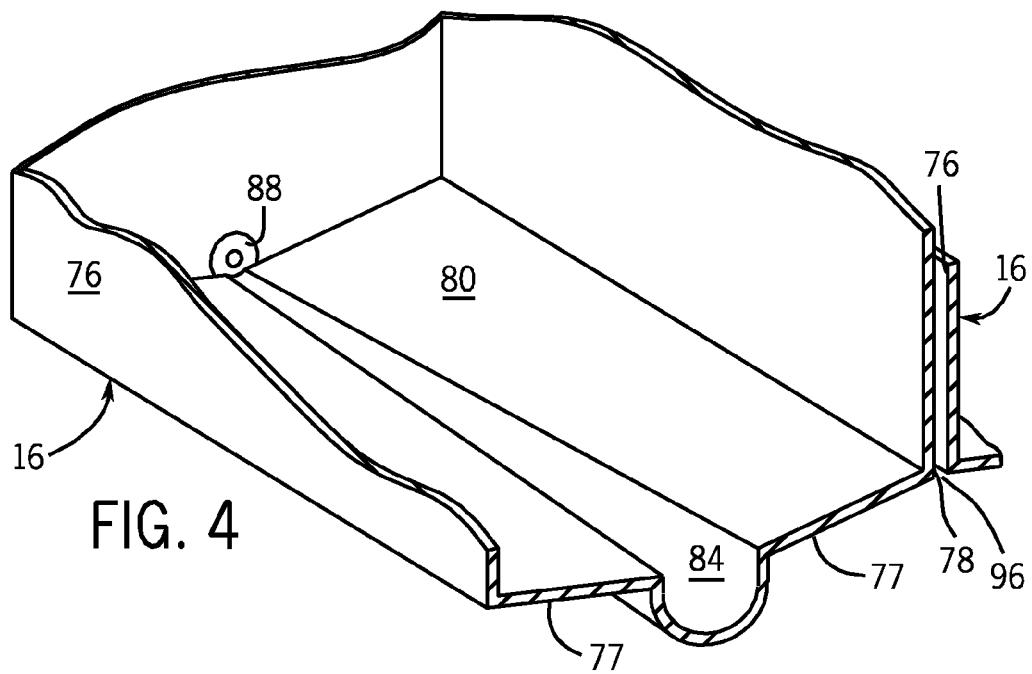
FIG. 4 is a partial isometric view along line 4-4 of FIG. 1.

The configuration and orientation of the tanks 16 are shown best in FIGS. 1 and 3. As noted above, the tank length L is greater than the tank width W. This tank 16 configuration establishes a tank 16 having a predominately longitudinal orientation in the direction of travel 64, that is, the tank longitudinal axis 74 is substantially parallel with the direction of travel 64. Furthermore, the tank 16 configuration allows multiple tanks 16 (a pair of tanks 16 as shown in the example embodiment) to be oriented substantially side-by-side. Specifically, the right side 78 of one tank 16 is proximate the left side 76 of the other tank 16. The tanks 16 need not be adjacent as shown in FIGS. 1, 3, and 4, but may be proximate with a larger gap 96 between the right side 78 and left side 76 of proximate tanks 16. Depending upon the application, a plurality of tanks 16 may be oriented side-by-side with each having a general longitudinal orientation relative to the direction of travel 64. In addition, the tank 16 orientation provides easy access to the outlet 82 and, as noted above, allows for various placements and configurations of the ground engagement wheels 52 and the like.

In the example embodiment, the tank length L and tank width W of each tank 16 are substantially similar. While this is the preferred configuration, one skilled in the art will appreciate that a variety of other relative tank lengths L and tank widths W are within the scope of the present invention. Additionally, the example embodiment illustrates a pair of tanks 16 that are generally cuboids in geometry (i.e., rectangular prisms, elongated cubes), however, the present invention is equally applicable to tanks 16 having less defined ends, sides, and surfaces (e.g., a cylindrically-shaped tank). In this situation, the length L and the width W are substantially approximated by the overall average of the length L and width W of the tank 16. Moreover, while the tanks 16 of the example embodiment are oriented relative to each other such that the respective fore ends 70 and respective aft ends 72 are proximate, the fore end 70 of one tank 16 may be proximate the aft end 72 of an adjacent tank 16 and remain within the scope of the present invention.

Figure 2:
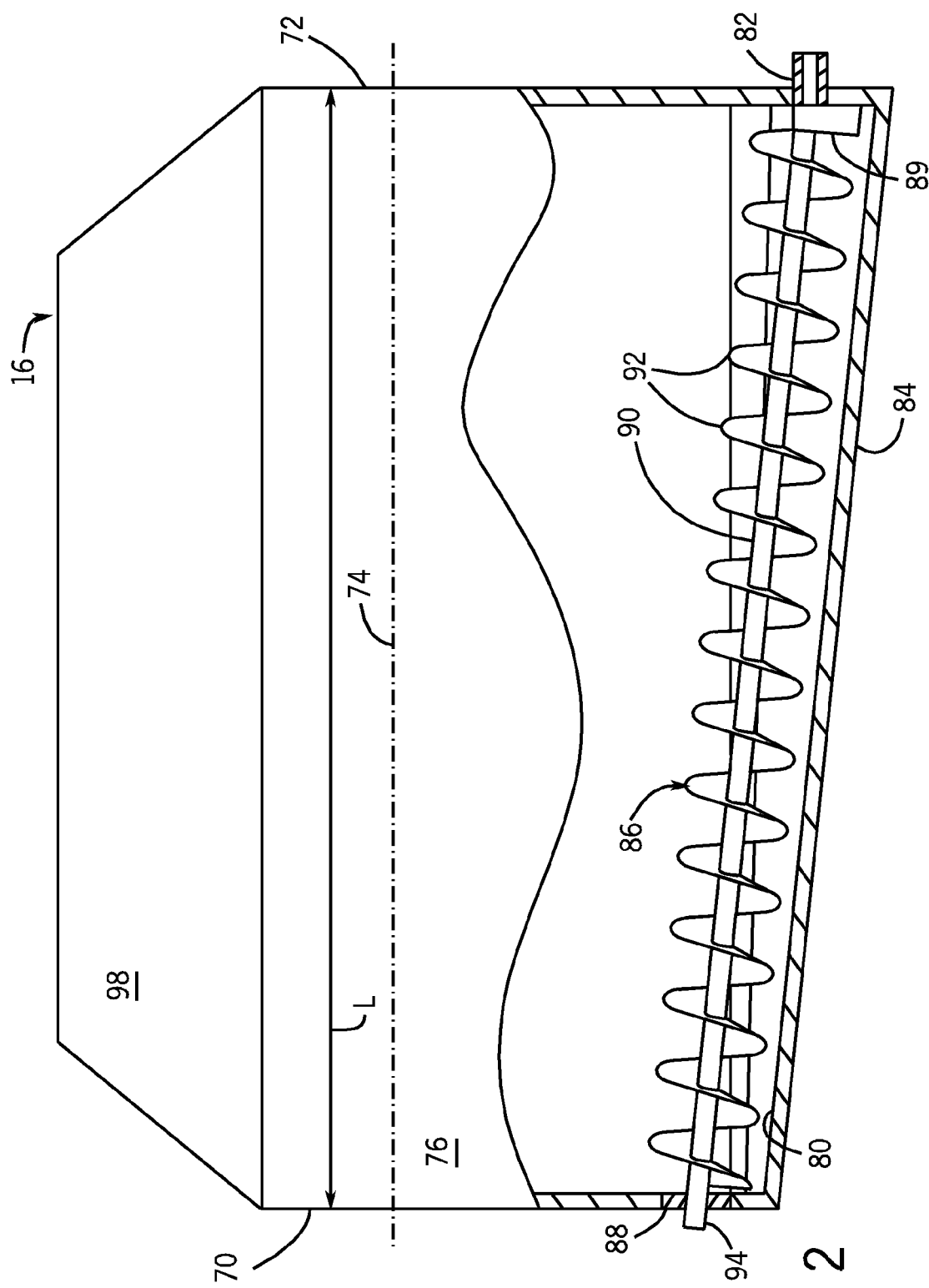
FIG. 2 is partial side view of the exemplary tanks shown in FIG. 1.

With specific reference to FIGS. 1 and 2, certain dense phase transfer arrangements require that the tank 16 be pressurized. The tank 16 may include a cover 98 of various geometries that extends between the fore end 70, the aft end 72, the left side 76, and the right side 78. The cover 98 preferably forms an airtight seal such that the tank 16 can be pressurized (i.e., a pressure tank) to pressures up to and over one bar (i.e., approximately fourteen and one-half pounds per square inch gauge). Specifically, a pressure supply 100 (e.g., a compressor) may be secured to the frame 50 and operatively coupled to pressurize the tank 16 via pressure line 102. The granular material 14 within the tank 16 is extracted proximate the outlet 82 and ultimately directed to the agricultural implement 10 (e.g., a dense phase air seeder as shown). The auger 86 may be incorporated to motivate the granular material 14 proximate the bottom surface 80 toward the outlet 82 of the tank 16.

Figure 5:
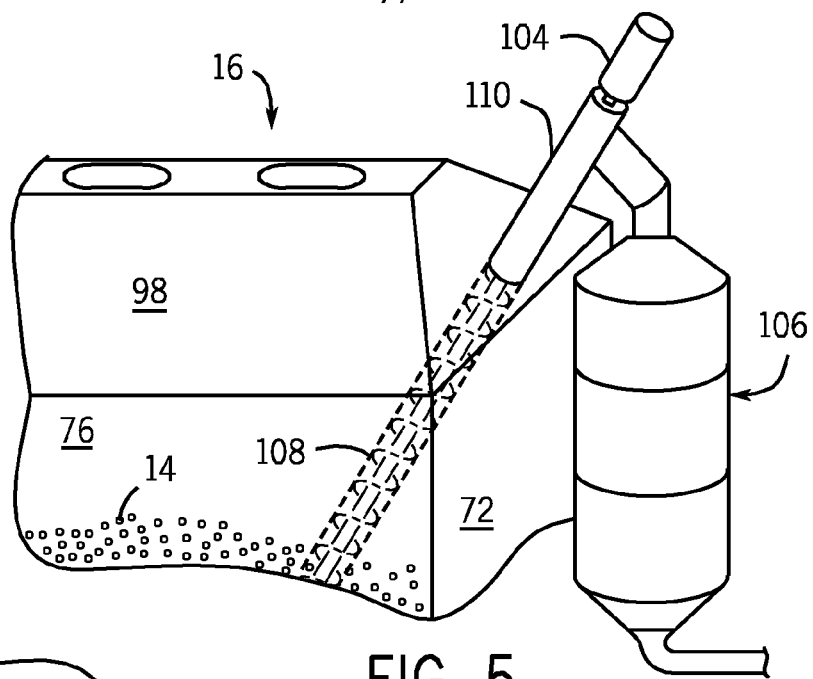
FIG. 5 is a partial perspective view of an induction auger operationally coupled to another exemplary containment assembly.

Turning to FIG. 5, an alternate configuration is shown incorporating an induction auger 104 that extends into the tank 16 to auger the granular material 14 from the tank 16 into a dense phase induction system 106 generally described in U.S. patent application Ser. No. 12/271,816. The dense phase induction system 106 does not require that the tank 16 be pressurized. The dense phase induction system 106 receives the granular material 14 via a transfer auger 108 housed in an auger chute 110. In this application, the cover 98 prevents foreign material from contaminating the granular material 14 within the tank 16.

A variety of alternative configurations and applications will be appreciated by one skilled in the art in view of this disclosure. Thus, the tank 16 orientation and configuration as found in the containment assembly 12 is applicable to a broad range of applications, including those found in the agricultural industry.

Figure 6:
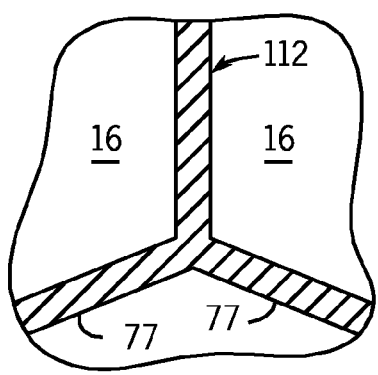
FIG. 6 is a partial detail view of an alternative embodiment.

Several example embodiments of the invention have been described in considerable detail. Many modifications and variations to the example embodiments described will be apparent to a person of ordinary skill in the art. For example, while the examplary embodiment shows two slightly spaced-apart tanks 16, one tank 16 having a left side 76 positioned near a right side 78 of an adjacent tank 16, the invention contemplates that a single wall may separate a pair of tanks 16. The left side 76 of one tank 16 and the right side 78 of a directly adjacent tank 16 may be defined by a single wall 112 (as shown in FIG. 6)—the single wall 112 defines both the respective left side 76 and right side 78. Therefore, the invention should not be limited to the preferred example embodiments described.

I claim:

1. A containment assembly moveable along a direction of travel for containing a granular material, comprising:
   a frame;
   a pair of ground engagement wheels rotatably coupled to the frame;
   a first tank coupled to the frame, comprising:
      a first tank fore end;
      a first tank aft end spaced apart from the first tank fore end;
      a first tank longitudinal axis defined between the first tank fore end and the first tank aft end, the first tank longitudinal axis substantially parallel to the direction of travel;
      a first tank length defined between the first tank fore end and the first tank aft end;
      a first tank left side extending between the first tank fore end and the first tank aft end;
      a first tank right side spaced apart from the first tank left side extending between the first tank fore end and the first tank aft end;
      a first tank width defined between the first tank left side and the first tank right side; and
      a first tank bottom surface extending between the first tank fore end, the first tank aft end, the first tank left side, and the first tank right side; said first tank bottom surface gradually slopes and defines a longitudinal pocket; wherein the first tank further comprises an auger proximate the first tank bottom surface for augering the granular material toward the first tank aft end; wherein said pocket receives the auger;

wherein the first tank bottom surface is contoured to direct the granular material toward the first tank aft end; and wherein the first tank length is greater than the first tank width; and a second tank coupled to the frame, comprising:
a second tank fore end;
a second tank aft end spaced apart from the second tank fore end;
a second tank longitudinal axis defined between the second tank fore end and the second tank aft end, the second tank longitudinal axis substantially parallel to the direction of travel;
a second tank length defined between the second tank fore end and the second tank aft end;
a second tank left side extending between the second tank fore end and the second tank aft end;
a second tank right side spaced apart from the second tank left side extending between the second tank fore end and the second tank aft end;
a second tank width defined between the second tank left side and the second tank right side; and
a second tank bottom surface extending between the second tank fore end, the second tank aft end, the second tank left side, and the second tank right side;
wherein the second tank bottom surface is contoured to direct the granular material toward the second tank aft end; and wherein the second tank length is greater than the second tank width;

wherein one of the first tank left side and the first tank right side are proximate one of the second tank left side and the second tank right side.

2. The containment assembly of claim 1, further comprising a pair of bottom panels sloping towards the pocket around 30° proximate the fore-end and increasing gradually to 47° proximate the aft-end.

3. The containment assembly of claim 1, wherein the first tank further comprises a first tank cover extending between the first tank fore end, the first tank aft end, the first tank left side, and the first tank right side.

4. The containment assembly of claim 3, further comprising:
a pressure supply secured to the frame and operatively coupled to the first tank;
wherein the first tank is substantially capable of being pressurized by the pressure supply.

5. The containment assembly of claim 4, wherein the first tank further comprises a first tank outlet proximate the first tank aft end and the first tank bottom surface.

6. The containment assembly of claim 1, further comprising an induction auger extending into the first tank to auger the granular material from the first tank.

7. The containment assembly of claim 1, wherein the first tank right side is adjacent the second tank left side.

8. The containment assembly of claim 7, wherein the first tank right side and the second tank left side comprise a single wall.

9. The containment assembly of claim 1, wherein the first tank length is substantially equal to the second tank length.

10. The containment assembly of claim 9, wherein the first tank width is substantially equal to the second tank width.

* * * * *